US008565959B2

United States Patent
Brown, Jr.

(10) Patent No.: US 8,565,959 B2
(45) Date of Patent: Oct. 22, 2013

(54) METHOD FOR DETECTION OF LOW LEAK RATES IN A TIRE

(75) Inventor: Jack Edward Brown, Jr., Akron, OH (US)

(73) Assignee: The Goodyear Tire & Rubber Company, Akron, OH (US)

(*) Notice: Subject to any disclaimer, the term of this patent is extended or adjusted under 35 U.S.C. 154(b) by 2061 days.

(21) Appl. No.: 11/003,261

(22) Filed: Dec. 3, 2004

(65) Prior Publication Data
US 2006/0122747 A1 Jun. 8, 2006

(51) Int. Cl.
*G06F 19/00* (2011.01)
*B60C 23/00* (2006.01)

(52) U.S. Cl.
USPC ........ 701/29.1; 701/29.2; 701/31.6; 701/31.7; 701/31.8; 701/31.9; 701/32.1; 340/426.33; 340/442; 73/146.2; 116/34 R

(58) Field of Classification Search
USPC .......................... 701/29–31, 31.6–32.1, 32.9; 340/426.33, 442–449; 73/146–146.8; 116/34 R
See application file for complete search history.

(56) References Cited

U.S. PATENT DOCUMENTS

| | | | |
|---|---|---|---|
| 4,186,377 A * | 1/1980 | Barabino ..................... 340/446 |
| 5,721,374 A * | 2/1998 | Siekkinen et al. ........... 73/146.2 |
| 5,721,528 A * | 2/1998 | Boesch et al. ............... 340/442 |
| 5,760,682 A * | 6/1998 | Liu et al. ..................... 340/444 |
| 5,801,306 A * | 9/1998 | Chamussy et al. .......... 73/146.2 |
| 5,940,781 A * | 8/1999 | Nakajima ...................... 702/98 |
| 6,275,148 B1 * | 8/2001 | Takamura et al. ........... 340/442 |
| 6,748,799 B2 | 6/2004 | Fischer et al. ............... 73/146.5 |
| 6,750,762 B1 | 6/2004 | Porter et al. .................. 340/447 |
| 6,868,358 B2 * | 3/2005 | Brown, Jr. .................... 702/138 |
| 6,907,776 B2 * | 6/2005 | Fischer et al. ................ 73/146 |
| 6,941,989 B2 * | 9/2005 | Grotendorst et al. ........ 152/415 |
| 2002/0196138 A1 | 12/2002 | Kogure et al. ............... 340/442 |
| 2003/0079536 A1 | 5/2003 | Fischer et al. ................ 73/146 |
| 2004/0017289 A1 * | 1/2004 | Brown, Jr. .................... 340/442 |
| 2006/0010961 A1 * | 1/2006 | Gibson et al. ................. 73/40 |

\* cited by examiner

*Primary Examiner* — Helal A Algahaim
*Assistant Examiner* — Chuong Nguyen
(74) *Attorney, Agent, or Firm* — Richard B. O'Planick

(57) ABSTRACT

Multiple leak rate methodologies are combined and operate in parallel in a system for providing optimal results under different tire conditions. The methodologies may operate continuously or alternatively. Tandem large leak rate and low leak rate algorithms and methodology, for example, may deployed in a system in which, for large leak rates, a large leak rate methodology is employed and used to trigger a warning. At some pre-designated low leak rate threshold value, the system employs a low leak rate methodology either as an exclusive diagnostic monitor or in parallel with the companion large leak rate methodology. In the low leak rate analytical system, a change in tire pressure is correlated to a change in energy within a vehicle system pursuant to the algorithm $W=\int \Delta P * dx$ and derivative algorithms are used to calculate a final time and pressure drop at the final time as a basis for issuing a low pressure warning.

8 Claims, 8 Drawing Sheets

METHOD FOR DETECTION OF LOW LEAK RATES IN A TIRE

FIELD OF THE INVENTION

The invention relates generally to tire monitoring and warning systems and, in particular, to a method for providing a warning when tire pressure experiences a very low leak rate or has been below a recommended pressure for a long time.

BACKGROUND OF THE INVENTION

It is well documented that maintaining a correct tire pressure improves handling, increases gas mileage, and extends the useful life of vehicle tires. Moreover, maintaining a correct tire pressure is an important consideration to the safe operation of a vehicle. Despite its irrefutable importance, tire pressure may not be monitored and maintained frequently enough by many in the driving public. Even well maintained tires may undergo a loss of pressure during the operation of a vehicle after sustaining damage, creating a potentially hazardous situation to the operator. In addition, with the advent of "extended mobility tires" (EMT) and their increasingly widespread commercial presence, it may be difficult for a vehicle operator to detect a low pressure or leak condition and take appropriate action. As a result, extended use of a tire in a low pressure condition beyond the manufacturer's recommended limit may occur.

Tire pressure monitoring systems are known and are increasingly utilized for the purpose of monitoring one or more tire parameters and alerting an operator when any of the measured parameters exceeds a preset threshold value. A timely warning encourages the driver to properly maintain tire inflation pressures. Such systems typically comprise one or more sensors that continuously measure tire parameters such as temperature and pressure and communicate measured data to a remote receiver for analysis. The purpose of a tire monitoring system is to provide the driver with a warning should an anomaly occur in one or more tires. Typically tire pressure and temperature are reported parameters. To be useful, the information must be quickly communicated and be reliable. However, displaying data derived from raw sensor measurement of temperature and pressure is not always sufficient to accurately represent the status of a tire that is undergoing a low rate of leakage. Moreover, tire monitoring systems that issue a warning only whenever a large change in tire pressure is detected are inadequate when pressure change within a tire is small and the tire pressure has been below recommended levels for a long period of time. Achieving a system and method that can issue a warning in low leakage situations or when a tire has been below recommended pressure for a long time has heretofore been problematic.

A need, therefore, continues to exist for a method of processing information in a tire undergoing a slow rate of leakage or has been below a recommended pressure for a long period of time. The desired interpretive framework should be robust, founded upon sound methodology, and providing a high degree of versatility. Various types of sensors are available for pressure detection, including piezoelectric sensors, electronic sensors, carbon sensors, optical reflection sensors, capacitive sensors, inductive sound sensors, and ultrasonic sensors. The desired interpretive methodology should be capable of utilization with and be independent of sensor, communication, and data processing hardware so as to find application in the wide range of monitoring systems in use today. Moreover, the interpretive methodology should require a relatively small amount of computer processing memory to further lower the associated hardware cost. Fundamentally, the interpretative methodology should deliver a timely warning to the driver when a tire is undergoing either a rapid deflation or a low rate of leakage but still above a minimum inflation threshold.

SUMMARY OF THE INVENTION

The subject invention addresses the need of the industry for a robust method of providing a driver with a low pressure warning for a range of deflation conditions. The methodology provides an accurate and timely warning when the rate of leakage within a tire is rapid or very low or when a tire has been in an under-inflated condition for a long period of time. Pursuant to one aspect of the invention, an analog model and associate algorithms are used for simulating a slow tire leakage system. The model analogizes a change in tire pressure as a change in energy within a vehicle system represented by the change in pressure undergone within the vehicle system times the distance the vehicle travels. Thus, as pressure within a tire or tires change, the energy in the system changes. A recommended cold pressure value and a low leakage RateLimit is specified. A pressure drop below the recommended pressure is measured by means of conventional sensor apparatus at a sampling rate. For leak rates whose magnitudes are less than the minimum RateLimit, the resultant energy is thresholded by the value of the integral that is established by the rate limit as the pressure crosses the entire band low pressure threshold. For small leak rates that have a magnitude less than the RateLimit, the energy integral will reach a threshold before the pressure reaches a critical limit.

Pursuant to another aspect of the invention, multiple leak rate methodologies are combined and operate in parallel in a system for providing optimal results under different tire conditions. The methodologies may operate continuously or alternatively. In one aspect of the invention, tandem large leak rate and low leak rate algorithms and methodology are used. For large leak rates, the large leak rate methodology is employed and used to trigger a warning. At some pre-designated low leak rate threshold value, the system employs a low leak rate methodology which is either the exclusive diagnostic monitor or in parallel with a companion large leak rate methodology. Both systems may be employed alternatively or in unison for validation purposes whereby achieving a high predictive accuracy with minimal false alarms.

BRIEF DESCRIPTION OF THE DRAWINGS

The invention will be described by way of example and with reference to the accompanying drawings in which.

DETAILED DESCRIPTION OF THE INVENTION

Figure 1:
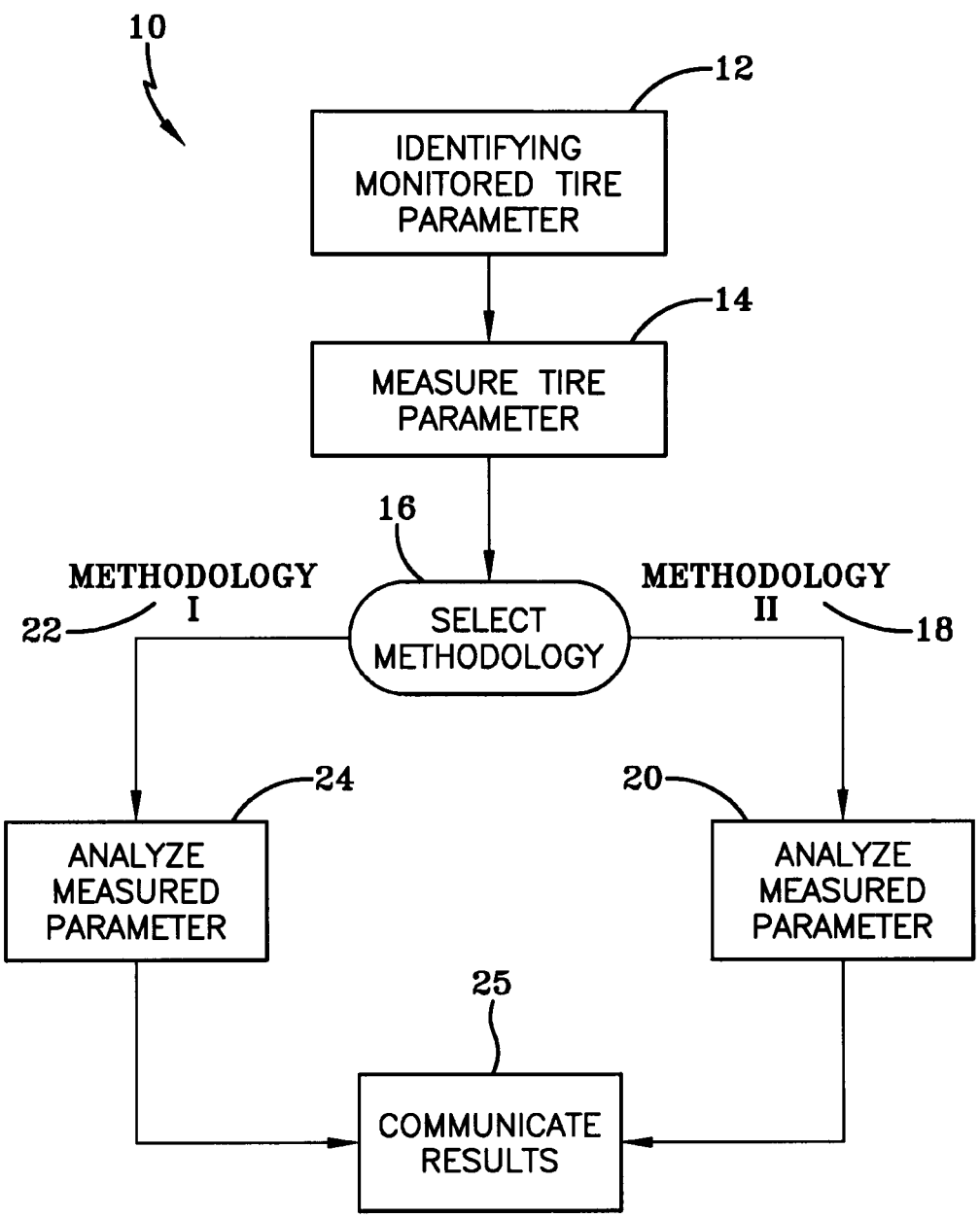
FIG. 1 is a block diagram showing a representative multiple methodology system in which alternative methodologies operates in parallel.

Referring initially to FIG. 1, a simplified multiple methodology system is shown for alternative or combined operation off of a specified tire parameter. The subject system 10 shows two methodologies in parallel but the invention is not so limited. More methodologies may be deployed if desired in order to render an optimal result. The system 10 includes the establishment of a monitored tire parameter such as, but not necessarily restricted to, tire pressure. Other parameters such as load, temperature, etc. may be selected as the monitored tire parameter. The system contemplates the measurement of the selected tire parameter 14. Using tire pressure as the measured tire parameter, various hardware and software relating to tire pressure monitoring devices are available and may be utilized to measure the pressure within a tire cavity and communicate such measurements to a receiver for subsequent processing and analysis.

Based upon a pre-established selection criteria, such as a low pressure leakage rate, a methodology best suited to evaluate the measured tire parameter is selected as shown at block 16. A first methodology 22 and a second methodology 18 are arranged in parallel to operate cooperatively in unison or in the alternative. As used herein, "methodology" and "analytic system" are used interchangeably. Based upon the selection criteria either or both methodologies may be employed. For example, both methodologies 18, 22 may be used simultaneously to provide self-validation and verification. Depending upon the methodology selected, the measured parameter is evaluated 20, 24 pursuant to appropriate algorithms and analytic techniques. The results are communicated 24 in a form that will be useful in advising a vehicle operator as to the status of the tires on the vehicle such as via indicator or warning lights. By way of specific exemplary application, the monitored tire parameter may be tire pressure and the selection methodology 16 may be a definition of a "low" versus a "high" leak rate. For example, a low leak rate may be more accurately and with fewer erroneous results be evaluated pursuant to methodology 22 while a high leak rate may be more accurately and with fewer erroneous results be evaluated pursuant to methodology 18. As mentioned previously, it may be desirable to utilize the results of both methodologies continuously and/or simultaneously for confirmation purposes rather than in the alternative.

Figure 2:
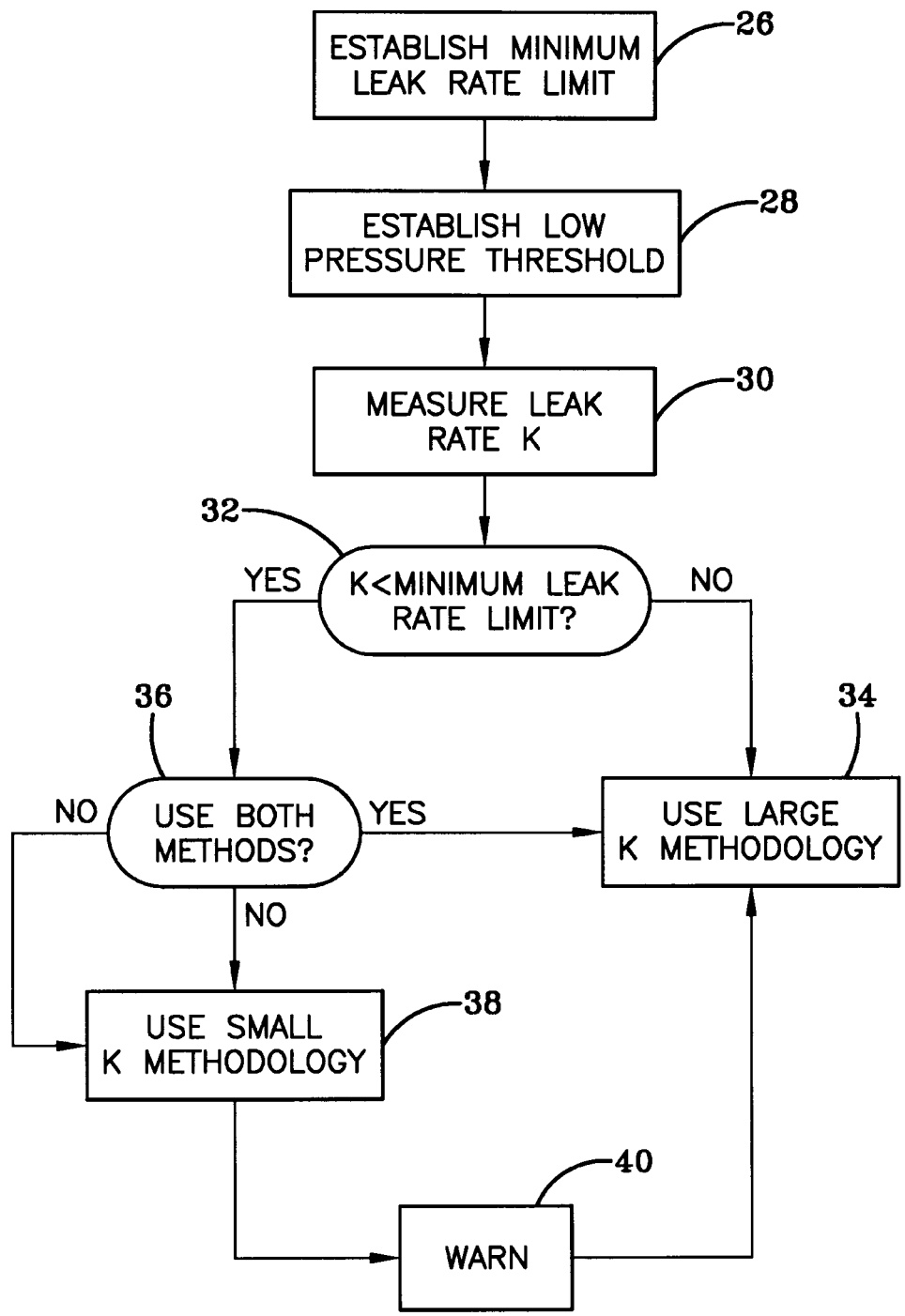
FIG. 2 is a block diagram that shows one aspect of the invention in which high and low rate methodologies operate in parallel in a multiple methodology system.

Referring to FIG. 2, a parallel tire monitoring system is depicted for the example in which the leak rate of a tire is to be evaluated by one methodology or another or both based upon a whether the leak rate is by definition "high" or "low". An established minimum leak rate limit is set 26 and a low pressure threshold 28 is defined. A tire leak rate K may be measured by commercially available sensor/communication hardware and software. If the measured leak rate K is greater than the minimum leak rate limit, a large leak rate model and methodology 34 may be utilized to analyze when the tire pressure will cross the predetermined low pressure threshold and issue a warning 40 accordingly. Such a model and methodology are set forth and disclosed in pending U.S. application Ser. No. 10/320,799, filed Dec. 16, 2002, and published Jan. 29, 2004, as US-2004-0017289-A1, hereby incorporated by reference. Such a methodology works well for rapid pressure changes or when the leak rate change occurs over a relatively short period of time.

Should the measured leak rate K be less than the minimum leak rate limit, the subject invention envisions that a small leak rate methodology 38 may be employed with or without simultaneous use of the large leak rate model 34 as a result of decision 36. As discussed previously, it may be beneficial to use both methodologies 34, 36 in parallel as a cross-verification. As a result of the evaluation of one or both methodologies 34, 38, a resultant warning 40 to the vehicle operator may issue.

Figure 3:
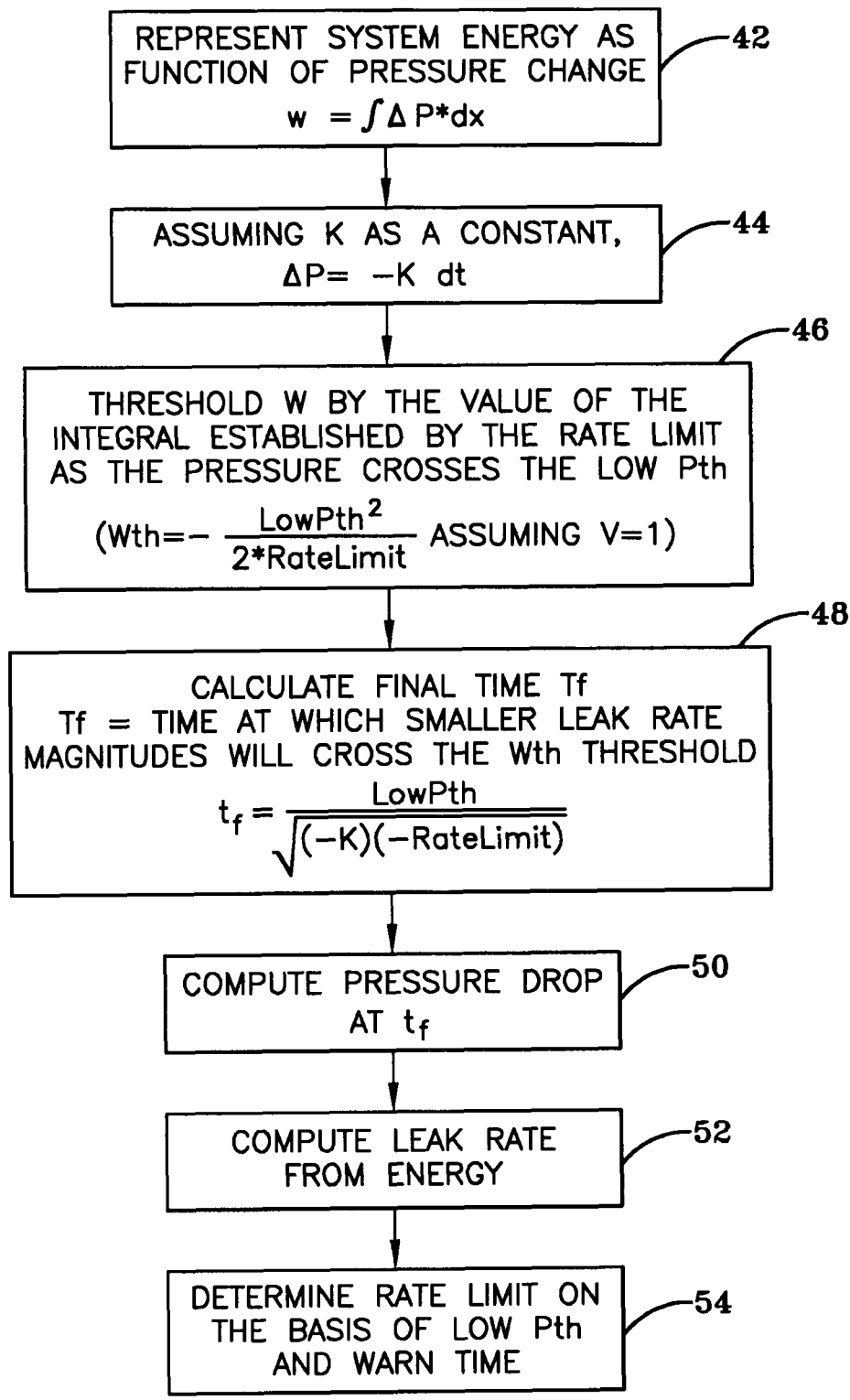
FIG. 3 is a block diagram that shows a low leak rate methodology.

With reference to FIG. 3, operation of the small leak rate methodology 38 will be explained. It is known that temperature or velocity correction in a tire can disguise or hide the presence of a leak or give a false alarm. The purpose of the methodology 38 is to provide a warning when the tire pressure experiences a very low leak rate or has been below the recommended pressure for a long time. False warnings may thus be avoided. An energy algorithm is employed that draws an analogy between a change in vehicle energy as a function of change in tire pressure times the distance traveled by the vehicle. The rationale for drawing such an analogy is that as tire pressure is reduced due to a leakage, the contact surface between the tire and ground increases. The force required to move the vehicle changes and that change in force through a distance traveled represents energy that is used in the system to do work.

Energy Integral Method

Accordingly, the "energy" is represented by $\Delta p^* dx$ $$W = \int \Delta p^* dx = \int \Delta p^* V^* dt \quad \text{(Equation 1)}$$

Where $\Delta p$ is the pressure drop below the recommended value, and the sampling rate is dt:

$$\Delta p = \text{RCP} - \text{pressure} \quad \text{(Equation 2)}$$

The pressure drop is assumed to have a constant leak rate K, which is a negative number. The pressure drop with respect to time is defined as a positive quantity:

$$\Delta p = -K^* t \quad \text{(Equation 3)}$$

In equation 3, time is relative to the frame of reference where the pressure crosses below a recommended cold pressure value (RCP) and enters the pressure difference band defined by the parameter LowPTh. Equation 3 is used in the following derivation, while equation 2 is implemented in computer pseudo-code.

For leak rates that are less than the minimum RateLimit, the result W is thresholded by the value of the integral that is established by the RateLimit as the pressure crosses the entire band LowPTh.

$$Wth = -\frac{LowPTh^2}{2 * RateLimit} \quad \text{(Equation 4)}$$

Equation 4 is derived from the area of a triangle. For small leak rates that have a magnitude less than RateLimit, the energy integral will reach this threshold before the pressure reaches the critical limit. The pressure drop at which Wth is exceeded gets smaller with smaller leak rate magnitudes (see equation 6). This is opposite the trend from the pressure drop of the large leak rate methodology 34, such as the 'time left' algorithm disclosed in pending U.S. patent application Ser. No. 10/329,799. Therefore an intersection occurs as shown in GRAPHS 1 and 2. In Graph 1, pressure drop below the RCP is depicted graphing pressure difference from RCP against leak rate. In Graph 2, pressure at warning is depicted graphing pressure at warning against leak rate. It should be noted from GRAPHS 1 and 2 that the energy algorithm (low leak rate methodology 38) dominates below −0.124 kPa/min.

In the derivations, the velocity V cancels out, or it is set to 1. Smaller leak rate magnitudes will cross the Wth threshold at a final time of $$t_f = \frac{LowPTh}{\sqrt{(-K)(-RateLimit)}} \quad \text{(Equation 5)}$$

Equation 5 is derived from the substitution of Equation 3 into Equation 1 for ΔP. The values of $t_f$ are plotted in Graph 3. The pressure drop at this time is $$dP = -K * t_f = \sqrt{(-K)} * \frac{LowPTh}{\sqrt{(-RateLimit)}} \quad \text{(Equation 6)}$$

The negative signs have been inserted in order to make the quantity under the radical positive. The pressure drop values are represented in Graph 1.

If V=1 in equation 1, then the first derivative of the energy W is just the pressure drop Δp. It should be noted that the second derivative is the leak rate.

$$LeakRate = K = -\frac{d^2W}{dt^2} \quad \text{(Equation 7)}$$

Graph 3 represents a graph of time-to-warn vs. leak rate for the subject energy methodology. As would be expected, a higher leak rate translates into a shorter time to warn. Graph 4 represents a graph of pressure-at-warning vs. leak rate for a rate change point of −15 KPa/min.

It should further be noted that the intersection point between the two algorithms may be found. It is found by setting equation 6 equal to the pressure drop that is defined by the minimum leak rate, RateLimit:

$$dP2 = LowPTh + RateLimit * WarnTime \quad \text{(Equation 8)}$$

Solving for the Intersection:

$$K_0 = RateLimit * \left(1 + \frac{RateLimit * WarnTime}{LowPTh}\right)^2 \quad \text{(Equation 9)}$$

This quadratic formula turns out to have a minimum (maximum magnitude) when $$RateLimit = -\frac{1}{3} \frac{LowPTh}{WarnTime} \quad \text{(Equation 10)}$$

Equation 9 may be used to determine the relation between Rate Limit and Warn Time in Graphs 1, 2, and 3. Note that Equation 10 is used to determine when the low pressure analytic system is activated, depending on how much warning time is desired. Thus, the warn time in Equation 10 constitutes a pre-set value. The thresholding code may be implemented as a summation in each cycle:

If ((RCP−EnerBandDist)−pressure)>0
   W=W+(RCP−pressure)*dt;
Else
   W=0;
End

The EnerBandDist can be set to a small value based on experience. It can also act to defer warning due to altitude changes. The energy summation resets whenever the pressure goes above (RCP−EnerBandDist). A logic condition may be added for the thresholding:

W1=(W>WTh);

When said logic condition evaluates to true, the warning system 40 sets a software flag which indicates that the energy algorithm has detected a violation of the threshold Wth.

By way of example, in a warning system a yellow light may be controlled. The yellow caution light may act as a soft warning that can be driven by either methodology. An orange light could be used to indicate a more severe warning, representative of a rapid pressure loss and the orange light may not controlled by the energy method 38 but rather solely by the method 34. The combination of algorithm features tends to justify the use of 2 lights.

With continued reference to FIG. 3, the methodology 38 for small leak rates thus comprises the steps of representing energy of the system as a function of pressure change 42; assuming the leak rate to be a constant 44; thresholding energy by the value of the integral established by the minimum leak rate limit as the pressure crosses the low pressure threshold 46; calculating final time, defined as the time at which the smaller leak rate magnitudes will cross the energy threshold 48; and computing the pressure drop at the final time 50. The leak rate may be computed from the energy 52; and the rate limit determined on the basis of the low pressure threshold and warning time 54.

Figure 4:
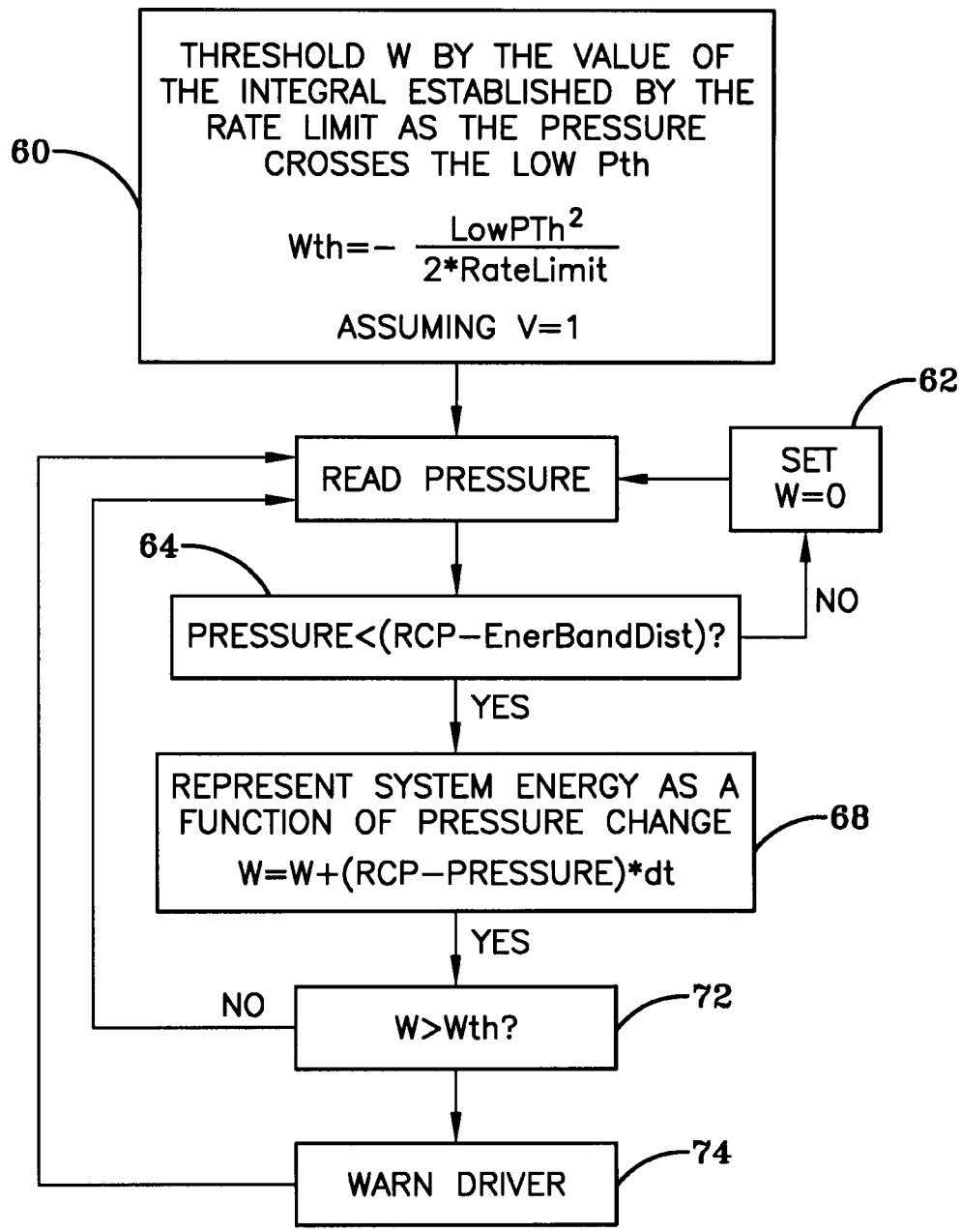
FIG. 4 is a block diagram that shows another embodiment of a low leak rate methodology.
Figure 5:
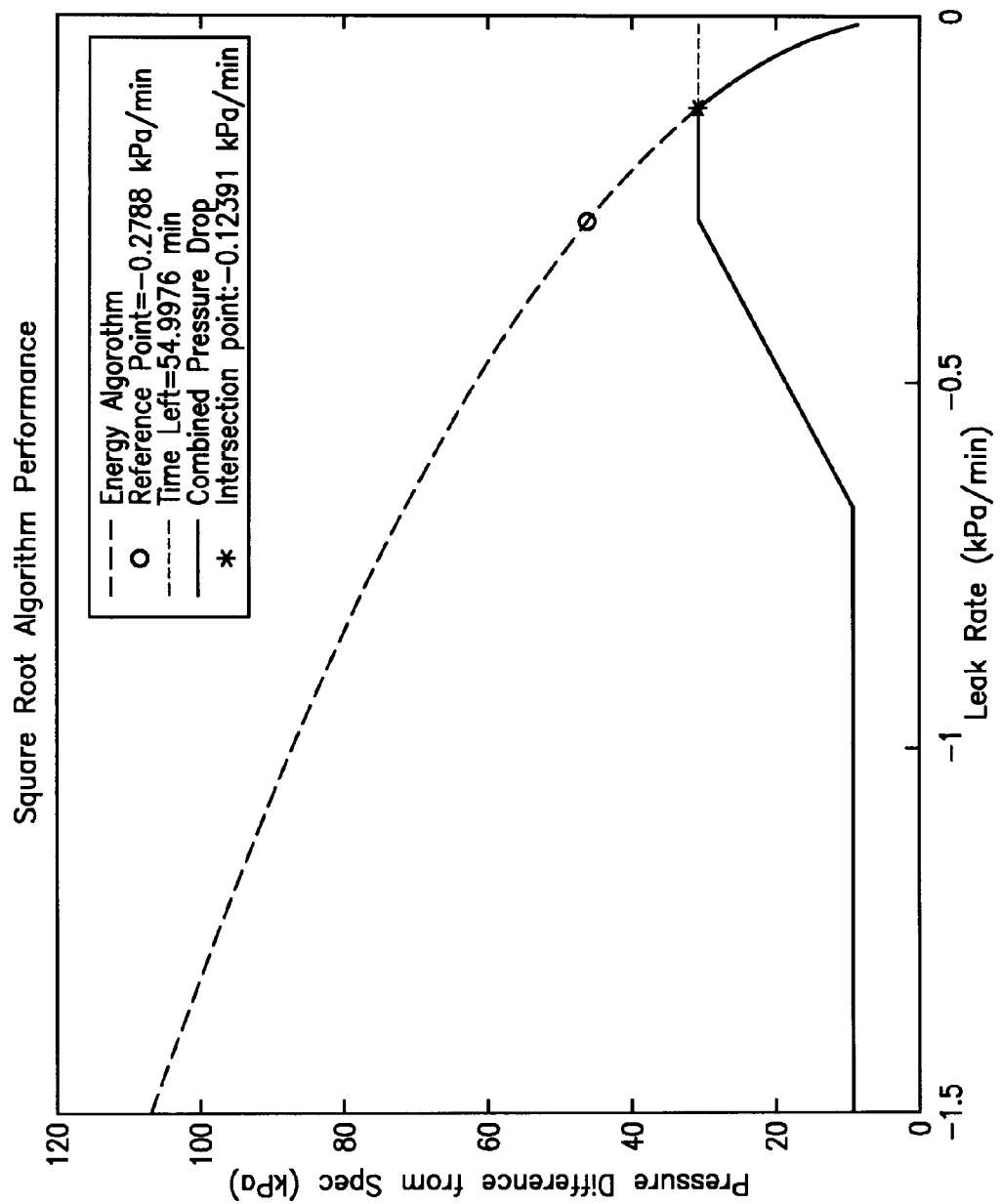
FIG. 5 is a square root graph of pressure vs. leak rate.
Figure 6:
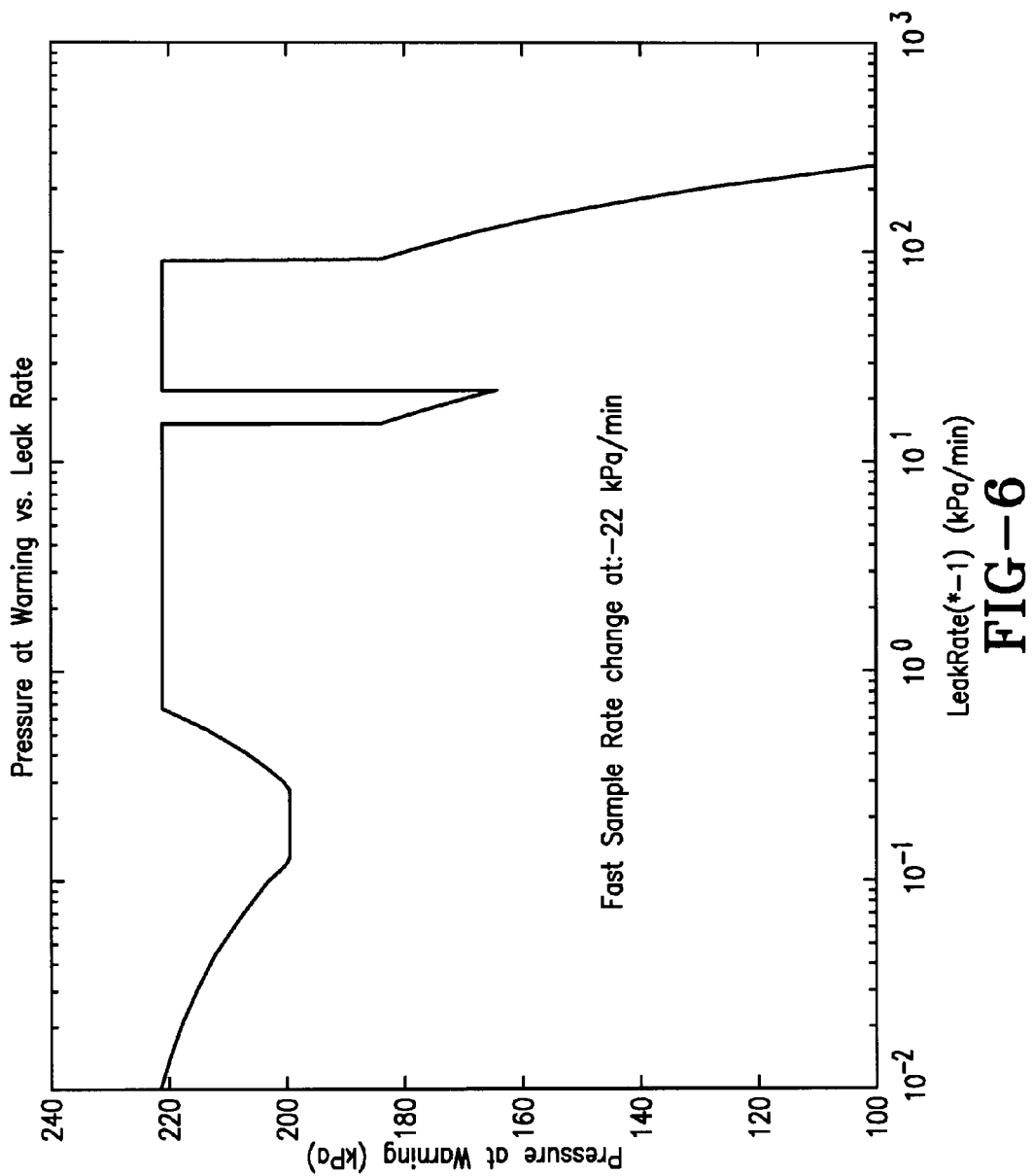
FIG. 6 is a square root graph of pressure vs. leak rate.
Figure 7:
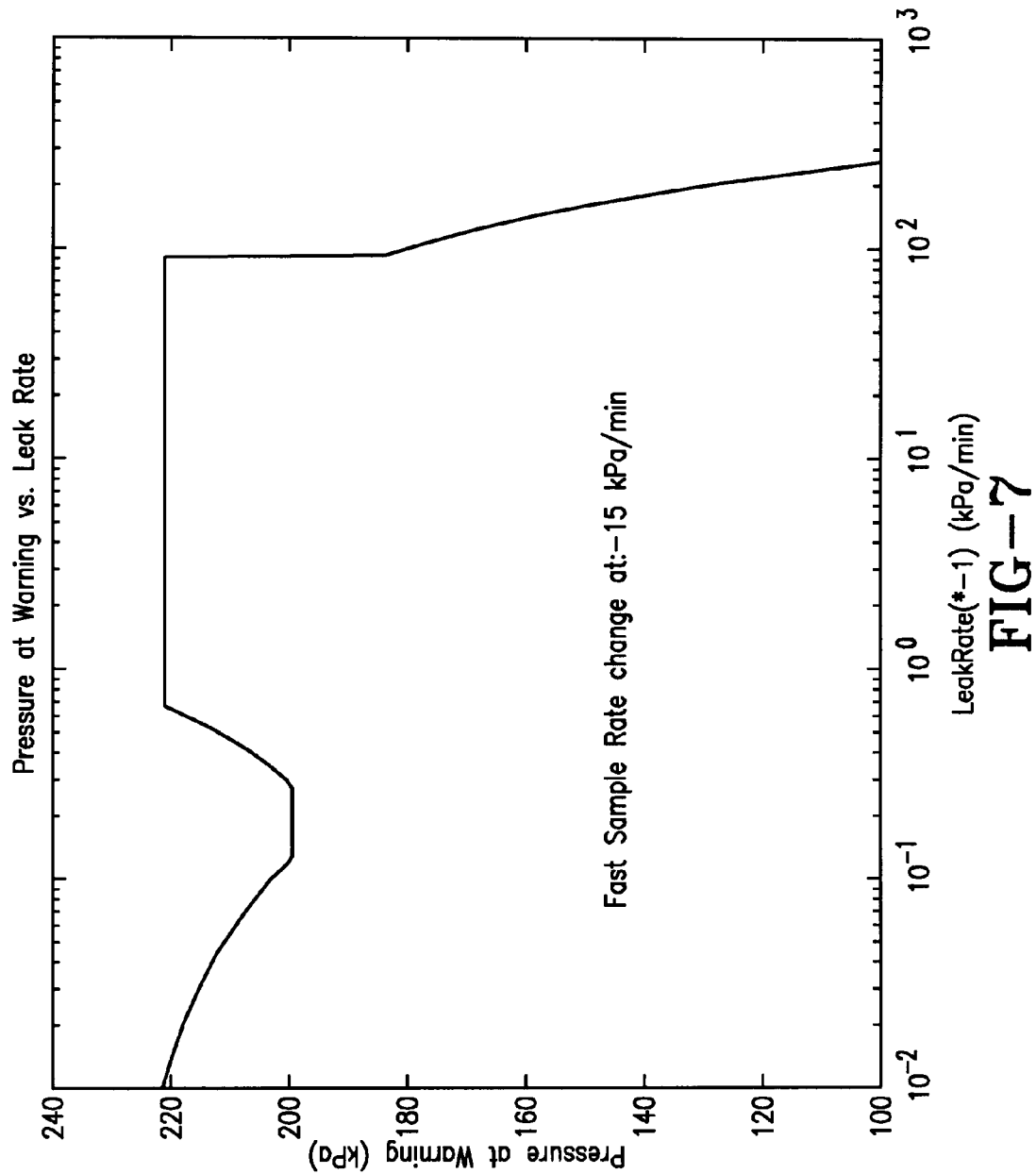
FIG. 7 is a square root graph of pressure vs. leak rate.
Figure 8:
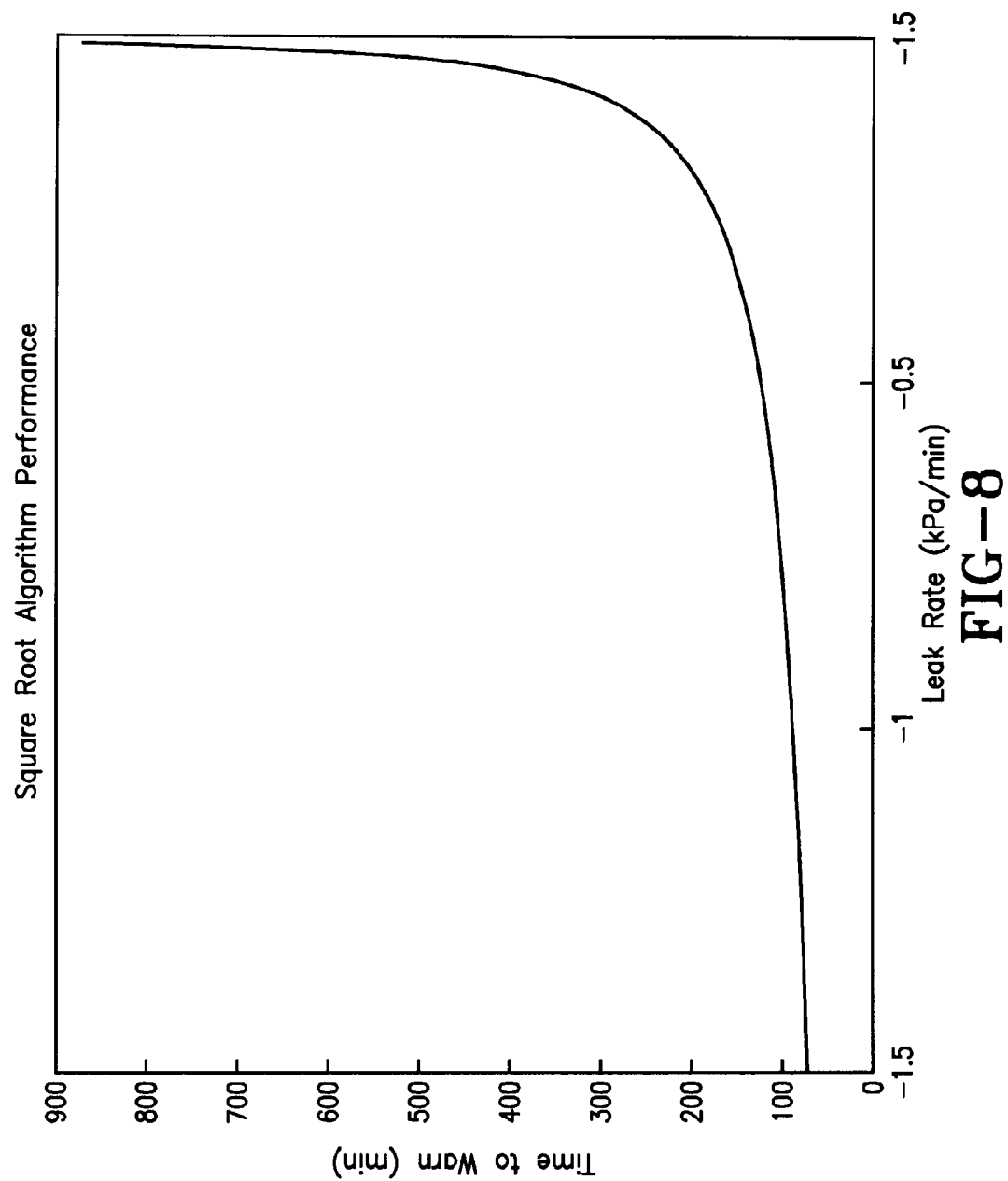
FIG. 8 is a square root graph of pressure vs. leak rate.

With reference to FIG. 4, a second alternative embodiment of the methodology 38 for small leak rates thus comprises the steps of representing energy of the system as a function of pressure change 68, thresholding energy by the value of the integral established by the minimum leak rate limit as the pressure crosses the low pressure threshold difference band 60, starting the energy integral calculation when pressure has dropped below the recommended cold inflation pressure by some specified amount 64, resetting the energy integral when pressure has returned above some specified value 62, and issuing a warning to the driver 74 when the system energy has exceeded the threshold value 72. FIGS. 5 through 8 are square root graphs of pressure vs. leak rates illustrating result verification of the subject methodology.

From the foregoing, it will be appreciated that the subject invention broadly contemplates the use of multiple methodologies in parallel, selecting an optimal combination of one or more analytic systems or methodologies to use under variable conditions. Switching from one methodology to another depending on preset parameters will allow for an optimal analysis of a condition such as (but not limited to) tire pressure. In so doing, false alarms resulting from various extrinsic and intrinsic factors will be minimized and a more accurate depiction of the condition of a system is achieved.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A method for monitoring a measured tire parameter comprising the steps:
   a. identifying tire air pressure as a monitored tire parameter;
   b. measuring the tire parameter;
   c. formulating an analytic system strategy for an evaluation of the tire parameter based upon a plurality of analytic systems, the strategy formulation selecting between the use of a single analytic system and, in the alternative, the simultaneous parallel use of a plurality of analytic systems;
d. selecting at least one analytic system for evaluating the tire parameter measurement from the plurality of analytic systems, wherein selecting at least one analytic system comprises the steps:
 establishing a non-zero minimum leak rate limit (RateLimit);
 establishing a non-zero low pressure threshold difference band (Low Pth);
 measuring a leak rate (k); and
 using an analytic system optimally suited for the measured leak rate;
e. analyzing the measured tire parameter by means of the selected analytic system; and
f. communicating a conclusion based upon the analysis of the measured tire parameter.

2. A method according to claim 1 wherein the communication of the conclusion based upon the analysis of the measured tire parameter comprises a low tire air pressure warning.

3. A method according to claim 1, wherein the plurality of analytic systems comprise at least a relatively lower leak rate analytic system and a relatively higher leak rate analytic system.

4. A method according to claim 3, wherein the lower leak rate and the higher leak rate analytic systems are selectively employed in the alternative based on the analytic system strategy.

5. A method according to claim 3, wherein the lower leak rate and the higher leak rate analytic systems are employed simultaneously based on the analytic system strategy.

6. A method for monitoring a measured tire parameter comprising the steps:
 measuring tire air pressure as a tire parameter;
 formulating an analytic system strategy for an evaluation of the tire parameter based upon a plurality of analytic systems, the strategy formulation selecting between the use of a single analytic system and, in the alternative, the simultaneous parallel use of a plurality of analytic systems;
 selecting at least one analytic system for evaluating the tire parameter measurement from the plurality of analytic systems;
 analyzing the measured tire parameter by means of the selected analytic system;
 communicating a conclusion based upon the analysis of the measured tire parameter;
 wherein the selection of at least one analytic system is at least partly based upon a leakage rate of air pressure within the tire;
 wherein the communication of the conclusion based upon the analysis of the measured tire parameter comprises a low tire air pressure warning;
 wherein selecting at least one analytic system comprises the steps:
  establishing a non-zero minimum leak rate limit (RateLimit);
  establishing a non-zero low pressure threshold difference band (Low Pth);
  measuring a leak rate (k); and
  using an analytic system optimally suited for the measured leak rate; and
 wherein the at least one analytic system comprises the steps:
  representing system energy (W) as a function of tire pressure change $\Delta P$;
  thresholding system energy (Wth) by the value of a lower rate limit as tire pressure crosses a low pressure threshold;
  calculating final time (tF) at which the smaller leak rate magnitudes will cross the Wth threshold; and
  computing pressure drop at tF.

7. A method according to claim 6, further comprising the step of computing leak rate from the system energy W.

8. A method according to claim 6, further comprising the step of computing the RateLimit as a function of LowPth and a pre-selected warn time.

* * * * *